UNITED STATES PATENT OFFICE.

JOHN McKILLOP, OF BROOKLYN, NEW YORK.

IMPROVED PICTURE-VARNISH.

Specification forming part of Letters Patent No. 44,543, dated October 4, 1864.

*To all whom it may concern:*

Be it known that I, JOHN McKILLOP, of the city of Brooklyn, in the county of Kings and State of New York, have invented a new and improved varnish for lithographs, show-cards, or other pictures, impressions, or designs on paper, card-board, or other materials; and I do hereby declare that the following is a full, clear, and exact statement of the component parts of and manner of compounding and using the same.

Take eight (8) ounces of the ordinary refined white gelatine of commerce, add sixty (60) ounces of cold water, and when the gelatine has been thoroughly soaked, heat and boil till a perfect mixture is effected. Take, also, one (1) ounce of alum, and dissolve in sixteen (16) ounces of boiling or nearly boiling water. Add one (1) ounce of this solution to every twelve (12) ounces of the gelatine solution above mentioned while both solutions are hot or nearly at boiling temperature, and stir till the two solutions are thoroughly mixed. The mixture thus obtained is ready for immediate use, and may be used at any temperature not less than 60° Fahrenheit. The room or place where it is used should be of a temperature from 70° to 80° Fahrenheit. The manner of using it is to pour it on a clean and smooth glass plate of a size not less than that of the surface to be coated in such quantity as to form a thin but perfectly uniform and even coating, and left to become so dry that the touch of the finger will not indent it. The card, picture, or other article to be coated is then moistened with water until its surface is thoroughly damp, but not wet, and in this condition is spread evenly over the coating on the glass plate, and placed or left to dry in a room at a temperature of from 60° to 80° Fahrenheit. When it is perfectly dry, it can be easily pulled from the plate, bringing with it the coating, which has a beautiful even glazed surface.

The object of the alum in the varnish is to make it leave the glass plate easily.

This varnish is much cheaper than the varnish which is the subject matter of Letters Patent granted to me on the 26th day of May 1863, and though less flexible and mellow, it answers very well for common kinds of work, at a considerable saving of expense.

I am aware that a mixture of gelatine and alum has before been used for coating pictures, but the proportions of the ingredients and the manner of compounding them were not such as to adapt the coating to be applied in the same way as mine. The coating referred to is adapted for application with a brush, or can be applied by pressure to a limited surface, but the large quantity of alum employed for rapid drying renders it impossible to apply the coating so made as a varnish to pictures of large size by flowing it uniformly over an extended surface of glass. To adapt the varnish to flow freely upon the glass, and thus produce the necessary uniformity in depth, the quantity of alum used must be limited to about the proportions above specified. I have also found that potash or a suitable alkali may be used with good effect as a substitute for the alum.

I do not confine myself to the precise proportions herein specified of the ingredients of which the varnish is composed, as these may be varied to some extent without materially altering its character, and I have merely stated those proportions which I have found in practice, all things considered, the best; but

What I claim as my invention, and desire to secure by Letters Patent, is—

The varnish or coating composed of gelatine, alum, or its described equivalent, and water, in about the proportions herein specified.

JOHN McKILLOP.

Witnesses:
JAS. R. HALL,
GILBERT W. BANKER.